United States Patent [19]
Lynch

[11] Patent Number: 6,002,916
[45] Date of Patent: Dec. 14, 1999

[54] SPACE-BASED SERVER NETWORK ARCHITECTURE

[75] Inventor: William Charles Lynch, Los Altos, Calif.

[73] Assignee: Lockheed Martin Corporation, Sunnyvale, Calif.

[21] Appl. No.: 09/027,838

[22] Filed: Feb. 23, 1998

[51] Int. Cl.$^6$ ............................................... H04Q 7/00
[52] U.S. Cl. ................... 455/13.1; 455/13.2; 455/12.1; 455/427
[58] Field of Search ........................... 455/13.1, 13.2, 455/12.1, 427, 428, 429, 430; 244/164, 158 R; 342/352

[56] References Cited

U.S. PATENT DOCUMENTS

| | | |
|---|---|---|
| 4,375,697 | 3/1983 | Visher . |
| 4,612,546 | 9/1986 | Rosen . |
| 5,592,320 | 1/1997 | Wissinger . |
| 5,722,042 | 2/1998 | Kimura et al. ..................... 455/13.1 |
| 5,867,109 | 2/1999 | Wiedeman ........................ 455/13.1 |
| 5,867,783 | 2/1999 | Horstein et al. .................... 455/428 |
| 5,920,804 | 6/1999 | Armbruster et al. ............... 455/13.2 |
| 5,924,014 | 7/1999 | Vanden Heudel et al. ......... 455/12.1 |

*Primary Examiner*—Edward F. Urban
*Assistant Examiner*—Thuan T. Nguyen
*Attorney, Agent, or Firm*—Feix & Feix

[57] ABSTRACT

A space-based server network architecture (1) which permits on demand transfer of mission and control data between client satellites (14) in an orbit about earth and an earth station (20, 22, 24, 26) irrespective of the location of the client satellite (14) relative to the earth station (20, 22, 24, 26). The architecture includes a plurality of server satellites (10) located spaced apart in a earth orbit above the orbit of the client satellites (14). The server satellites (10) provide substantially total world-wide communications coverage to and connectivity with designated and authorized earth stations (20, 22, 24, 26) and the plurality of client satellites (14). Each server satellite (10) includes: a communications downlink (18, 18a, 18b) for providing intercommunication with designated and authorized earth stations within its field of view; communications crosslinks (12, 12a, 12b) for providing intercommunications with other server satellites within its field of view; and communications links (16, 16a, 16b) for providing intercommunication with a client satellite within its field of view. Client satellite control data originating from an earth station is passed directly to an accessible server satellite, which then passes the control data either directly to the intended client satellite if within its communications field of view, or forwards the control data to a server satellite having direct communications access to the intended client satellite. Mission data from a client satellite can at any time be transmitted to a designated earth station, irrespective of its location on earth, by transmitting first to a server satellite within its communication field of view, where the mission data is then either downlinked directly to the designated earth station if within its communications field of view, or transmitted to a server satellite having communications downlink access to the designated earth station.

18 Claims, 4 Drawing Sheets

SPACE-BASED SERVER NETWORK ARCHITECTURE

FIELD OF THE INVENTION

The present invention relates to a space-based network including a constellation of Geo-positioned earth orbit server satellites and low or medium earth orbit mission satellites and communications infrastructure that enables satellite control operations from space in a manner which prevents terrestrial-based attempts to jam, hack or otherwise interfere with satellite communications.

BACKGROUND OF THE INVENTION

In the last few years a new organization has been formed within the United States government known as Space Architects Office. The purpose of the Space Architects Office is to evaluate the escalating costs associated with operating U.S. satellites and to offer a plan to control costs as more satellites are planned to be launched in space.

One study conducted and completed this year by this Space Architects Office concluded that approximately 806 million dollars per year are expended by satellite control operations such as the Air Force Satellite Control Network, the Navy Satellite Control Network, the Naval Research laboratory Satellite Control Network, the Army Satellite Control Network, the NASA Space Satellite Control Network, and the civil communities NOAA Satellite Control Network. None of the above-mentioned satellite control networks are compatible with one another. There is also significant redundancy and overlap of satellite control operations between networks. This drives excess mission costs for the ground control segments of the various different satellite networks, especially in view of the fact that each network is supported by multiple ground control sites. In other words, each satellite control network is an independent stove pipe and this costs the U.S. tax payer a lot of money. For this reason, the government is undertaking an initiative to phase out these stove pipe satellite networks in an attempt to consolidate satellite operations among National Security, Civil and Commercial Space Sectors.

In parallel with the cost issue, the satellite industry is well aware and well advised to to develop and implement technologies that provide for the security of space assets. The new technologies must prevent unauthorized access or jamming or hacking of sensitive satellite communications. The problem of security of space assets is particularly acute in regional conflict situations where it is desirable to use satellites to observe ground troop movements and naval exercises, and to communicate sensitive information to "friendlies" in the conflict areas. It is therefor critical to the success of the mission that access to the space assets be denied to enemy forces.

Information warfare, space control, and information security are the prerequisite areas that must be factored into any new satellite control architecture. Present day satellite communications networks are susceptible to jamming, hackers, and interception by adversaries. In the event of major regional conflict in the future, there is much concern that serious attempts will be made to deny U.S. space assets by adversaries. To address this problem, the next generation of satellite control networks must include sufficient "Space Control" technology effective to maintain the full utility and control of satellite operations. Space Control is the ability to insure the total operation of space assets at any time as well as to deny the use of satellites to others.

SUMMARY OF THE INVENTION

Therefore, it is a principle object of the present invention to consolidate and simplify existing satellite control operations by placing the operations and control of satellites into space.

It is another object of the present invention to ensure survivability and non-vulnerability of government and/or commercial space assets.

In accordance with these and other objects of the present invention, there is provided a space-based server network architecture which accommodates the security concerns of the government and which facilitates control operations from space. The space-based server (SBS) network architecture of the present invention is based upon use of a host server in space Is to support military and potential military/commercial joint space missions. In addition, the invention can be applied to a commercial space architecture as well. The major components of the SBS network architecture includes a server component, a client component, an inter-satellite link (ISL) topology, memory storage and processor.

The server component includes a plurality of server satellites, preferably five to six in number plus an additional one for backup, placed in (an) appropriate orbit(s) so as to provide near, or total world-wide communications coverage to designated and authorized terrestrial receivers. One of the server satellites may be placed over a protected location (such as the continental United States or CONUS) to ensure further survivability and most direct access to a protected ground station. The remaining server satellites provide world-wide connectivity to all terrestrial locations on earth.

The server satellites are arranged in a ring topology about the earth and are cross linked to each by the inter-satellite communications link. In a preferred embodiment, the inter-satellite communications link comprises a wide-band laser or RF communications link. The server-server communications crosslink provides secure, survivable, non-vulnerable and uninterceptable transmission/reception of data between all server satellites.

The client component comprises a plurality of low and medium earth orbiting satellites (hereafter referred to as "client satellites"). The server satellites are linked to the client satellites via a server-client communications link. The server-client intercommunications link comprises an RF communications link (with a W-band RF communications link being preferred for secure transmission) or a laser communications link. The server-client communications link may additionally include an omni RF communications link as a back up comm link so as to ensure a high degree of client-server-ground accessibility in the event of an errant or tumbling client satellite.

Mission control data (Telemetry, Tracking & Control i.e., TT&C), originating from one or more designated terrestrial transmitting stations and intended for a designated client satellite, is passed directly to the accessible server satellite that is within the terrestrial communications link field of view of the terrestrial transmitting station(s). The server satellite, in turn, passes the mission control data either directly to the designated client satellite, if within its communications field of view, or transmits the data over the server—server communications crosslink to the server satellite having communications access to the designated client satellite. The server satellite having communications access to a particular client satellite is the "host server" for that client satellite. Also, the client satellite can at any time, transmit its mission data to any designated terrestrial receiver over the server—server communications crosslink which then forwards the data either directly to a designated terrestrial receiver, or relays the data to the server satellite having the designated terrestrial receiver within its communications field of view. Alternatively, the mission data may be stored onboard the server for subsequent retrieval. Stored information is also accessible by authorized client satellites or by authorized terrestrial (either fixed or mobile) stations. The designated terrestrial transmitting/receiving stations may be on land, sea or airborne platforms.

For the non-stored case, data is downlinked from the server via an RF communications link (with the microwave Extremely High Frequency (EHF) band being preferred) or laser communications link to ensure non-susceptibility to intentional interference, jamming or hacking. The server can provide bandwidth-on-demand using either RF, spot, laser or direct broadcast beam transmission for improved resistance to jamming and interception and guaranteed reception. Hence, each client has accessibility to any terrestrial point on earth, at any time, and at any location within its orbit. The combination of server satellites and the inter-satellite link topology comprise an architecture not unlike that found throughout offices and business locations on the planet.

The SBS network architecture may be extended to include a survivable ground element for military applications. In times of a major regional conflict (MRC), client-to-server data can also be passed to one or more designated air, sea (surface or submarine, the latter providing additional survivability, Battle Management Command Control Communications and Intelligence backup and stealthness of operation) or mobile ground locations.

In accordance with an advantageous feature of the invention, all TT&C functions directly interface with the SBS thereby eliminating the need for multiple mission ground stations which, in turn, significantly reduces overall program and mission life cycle costs.

The invention facilitates mission simplification by use of a single, or small dedicated distributed ground station netted architecture to support entire military TT&C and (optional) data downlink requirements.

An important advantage of the present invention is that it ensures a secure, jam resistant client TT&C infrastructure since the client Comm interface is with the server and not directly with a terrestrial source.

An advantageous feature of the present invention is that SBS architecture permits communication between a terrestrial based station and a client satellite at anytime and at any place in the client satellite's orbit since the client has continuous access to the server and is no longer dependent upon placement over the terrestrial ground station.

Another advantageous feature is that the optional RF omni W-band communication link as a back up comm link between the client and server satellites affords immunity to terrestrial-based attempts to jam, hack or otherwise interfere with client-server communications since W-band communications are non-transmittable through the earth's atmosphere. Further, the omni RF W-band communications link also ensures client-server connectivity in the event of a tumbling client or partial loss of client attitude stabilization.

In accordance with another advantageous feature of the present invention, the communication link radiation pattern from the client to the server may be directed upwards towards the server rather than downwards towards earth thus further affording resistance to jamming, hacking, and signal interception.

Another advantage of the present invention is that it reduces the need for other existing and/or dedicated relay satellites since the SBS is continuously in-the-loop and comm accessible to all designated clients.

The present invention supports military and government architecture survivability and vulnerability goals due to: (1) SBS placement in Geo-orbit; (2) use of a secure, wide band RF or laser inter-satellite communication links between server satellites; (3) provision for both high data rate spot beam transmission of wide band data and direct broadcasting of data at lower rates to broad terrestrial areas satisfying military and government needs to meet a full range of broadcast requirements for bandwidth on demand.

In accordance with another advantageous feature of the present invention, each host server may be provided with massive, partitioned and packetized onboard memory to support client cache or mission data storage needs, prefiltering and/or processing of client data prior to downlink and ground dissemination, and ground TT&C message storage for client interrogation.

Another advantage of the present invention is that the SBS network architecture further ensures ground interface survivability by use of: a) mobile ground reception stations; b) fleet ballistic missile submarines operating under conditions of stealth which readily provide backup support for BMC31 requirements.

Another advantage of the present invention is that it provides a secure space-based on orbit means for client-to-client data fusion via the SBS eliminating the need for multiple transmissions and relays to and from the ground station element.

Another advantage of the present invention is that it affords protection to combined commercial clients hosting military payloads in regards to data security, susceptibility, vulnerability and lines of connectivity.

Another advantage of the present invention is that enhanced survivability and redundancy in the SBS network architecture is afforded by including a backup server satellite in proximity to the master server satellite in a higher orbit capable of being drifted into the inter-satellite communication link topology upon demand.

Another advantage of the present invention is that it provides a means for client continuous access to the server for TT&C messages, cueing by other designated clients, continuous link closure also to manned satellite space missions, on orbit flight/mission software upgrades or modifications, data relay, reception and storage from planetary or deep space exploration missions, broad area announcement repository for space weather advisory, in general as an integrated turnkey architecture capable of supporting client needs regardless of client mission, type or location on orbit.

Another advantage of the present invention is that an Extremely High Frequency (EHF) communications downlink may be used for server to terrestrial communications to ensure resistance to jamming, interception, hacking by terrestrial sources.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

DETAILED DESCRIPTION OF THE PREFERRED EMBODIMENTS

The space-based server (SBS) network architecture is a unique space-based invention which facilitates satellite control operations from space. SBS refers to a constellation of Geo-positioned server satellites and includes the inter-satellite and satellite-to-ground communications infrastructure. As used herein, the term "server" refers to the constellation of server satellites. The server satellites are preferably positioned in a Clarke or geosynchronous earth orbit (GEO). The server satellites may also be placed in a medium earth orbit (MEO) or low earth orbit (LEO), or in any combination of GEO, MEO or LEO. Also as used herein, the term "client" or "clients" refers to mission satellites other than the server satellites which have communications accessibility directly to the server.

The SBS network architecture provides optional means for terrestrial-space communications and employs a novel simplified message connection protocol. The SBS network architecture is not dependent upon ground-based relay stations that degrade transmission performance and that are vulnerable to intrusion and disruption. The SBS provides for a seamless communications link between terrestrial sources (whether they are land-based, at sea or airborne) and client satellites over the SBS's communications field-of-regard.

Figure 1:
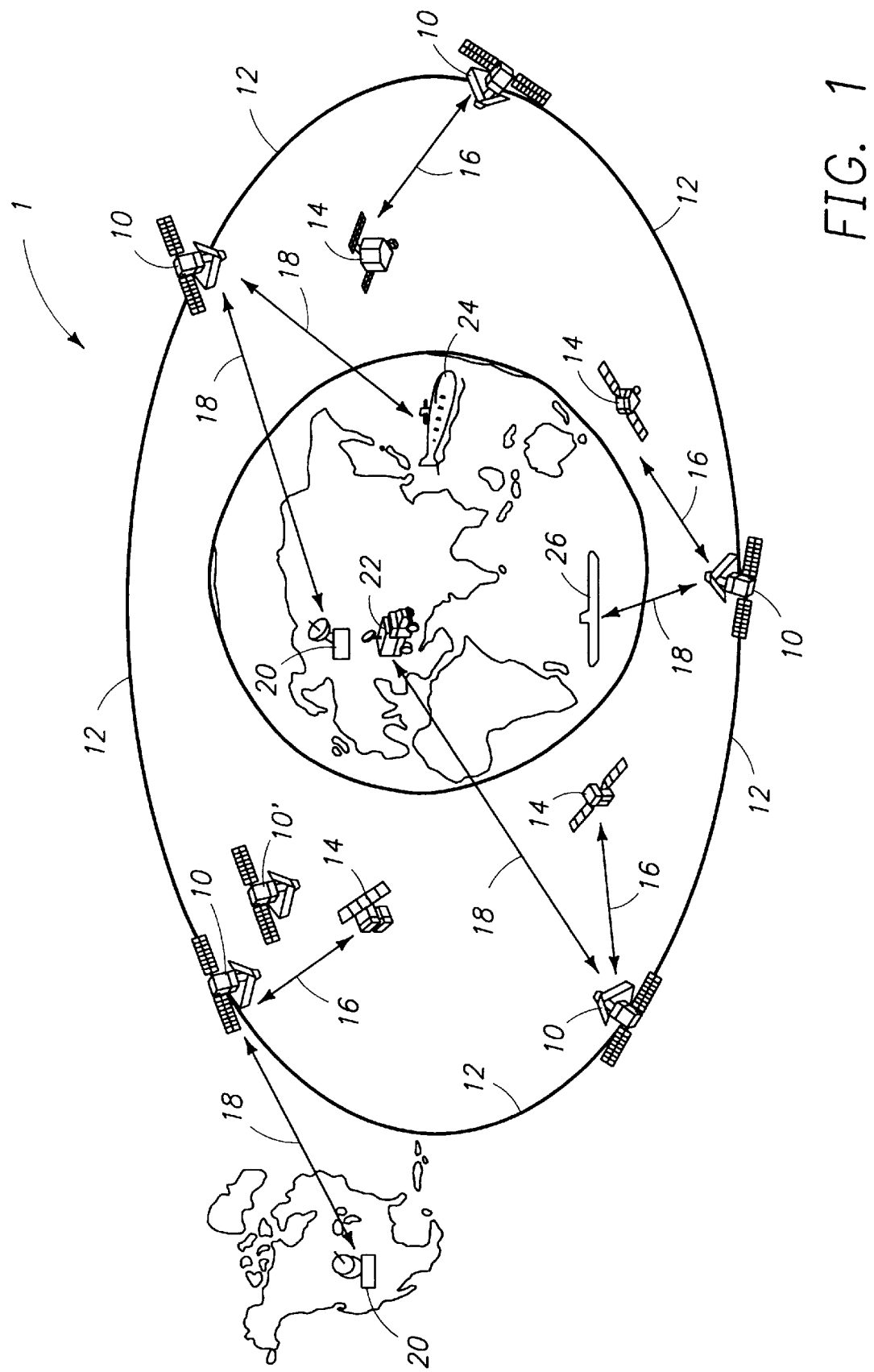
FIG. 1 is a perspective view of an exemplary satellite constellation in orbit around the earth, including a plurality of Geo-positioned server satellites and lower earth orbit mission satellites in accordance with a preferred embodiment of the present invention.

Referring now to FIG. 1, there is shown an exemplary configuration of the SBS network architecture in accordance with the present invention. The SBS network architecture is designated generally by reference numeral 1.

Figure 2:
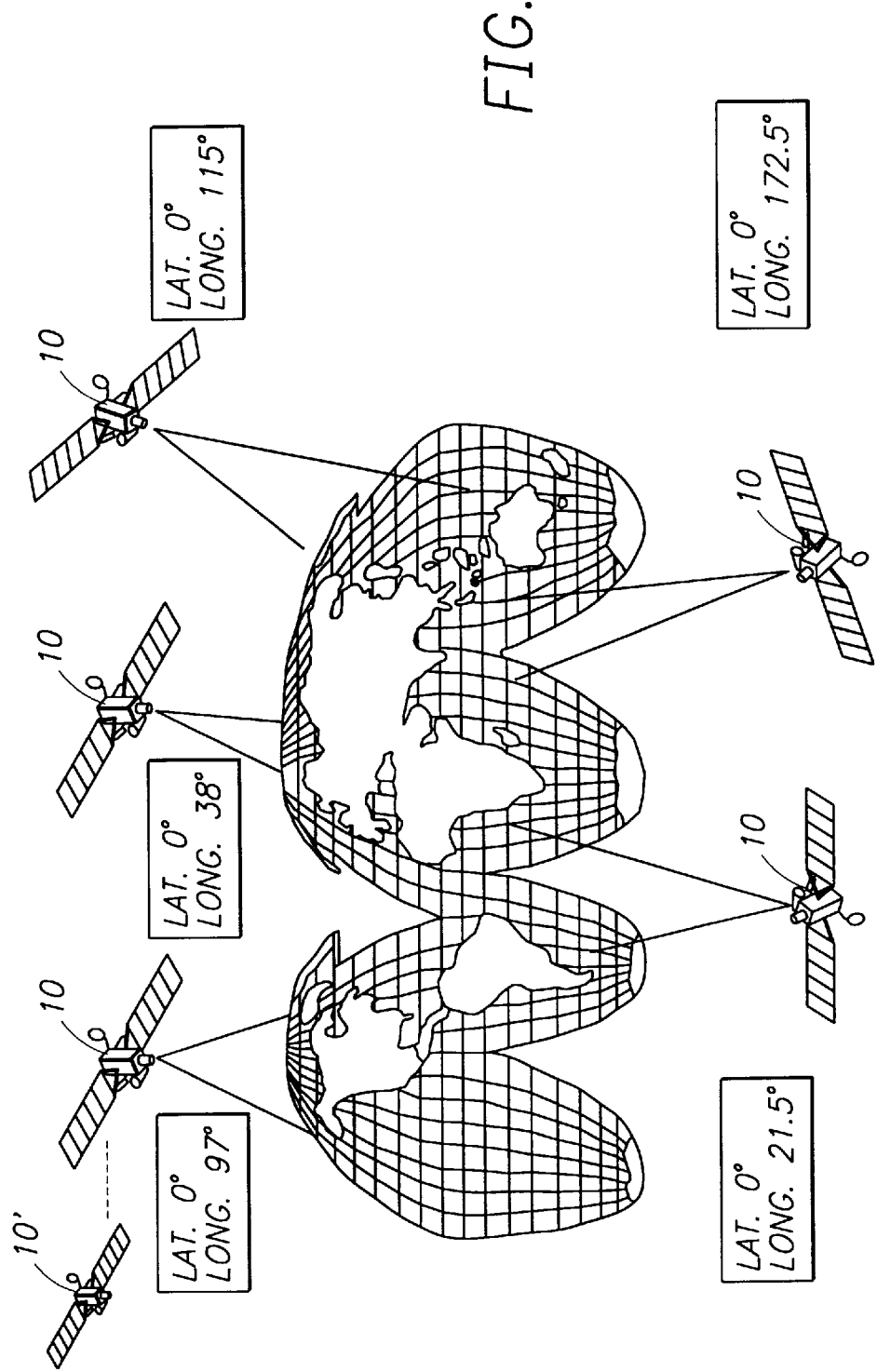
FIG. 2 is a homolosine projection of the earth that illustrates the total or near total world wide communications coverage afforded by the Geo-positioned server satellites.

The SBS network architecture 1 includes a plurality of server satellites 10 which are placed in orbit about the earth to provide substantially total world wide communications coverage to the earth. In accordance with a preferred embodiment of the invention, one of the server satellites 10 is placed over a protected location (such as the continental United States or CONUS) to ensure further survivability and most direct access to a protected ground station. The remaining server satellites provide world-wide connectivity to all terrestrial locations on earth. The communications coverage is limited only by earth oblateness at the polar regions. Representative earth orbit slots for the five server satellites 10 are shown in FIG. 2.

In a preferred embodiment of the invention, the server satellites 10 are placed in a Clarke orbit. It is understood that the server satellites may be MEO- or LEO-positioned as well, or, a the server satellites may be placed in any combination of GEO, MEO or LEO orbits.

In the embodiment shown, the server component includes five primary server satellites 10 and an additional back up server satellite designated by reference numeral 10'. The back up server satellite 10' can be moved into the predetermined orbit should one of the five primary server satellites 10 fail. The server satellites 10 are oriented in a ring topology about the earth for inter-satellite communication. The server satellites 10 communicate with one another across communications crosslink 12.

The SBS network architecture 1 also includes a plurality of client satellites 14 that are placed in orbit about the earth beneath the orbit of the server satellites 10. Server-client communication occurs across communications link 16. In the architecture of the present invention, client satellites may consist of one or more of the following: (1) satellites in various low and/or medium earth orbits having communications access to the SBS; (2) airborne platforms having SBS communications access (not shown); and (3) STS or SSTO-like exo-atmospheric combination platforms also having SBS communications access.

Communication between a terrestrial (earth) station and the various server satellites 10 occurs across communications link 18. The terrestrial transmitting/receiving stations may include one or more fixed-location ground stations 20, mobile ground stations 22. In addition, the terrestrial stations may include sea platforms (e.g., submarine 24 and surface ship 26) or airborne platforms.

Figure 3:
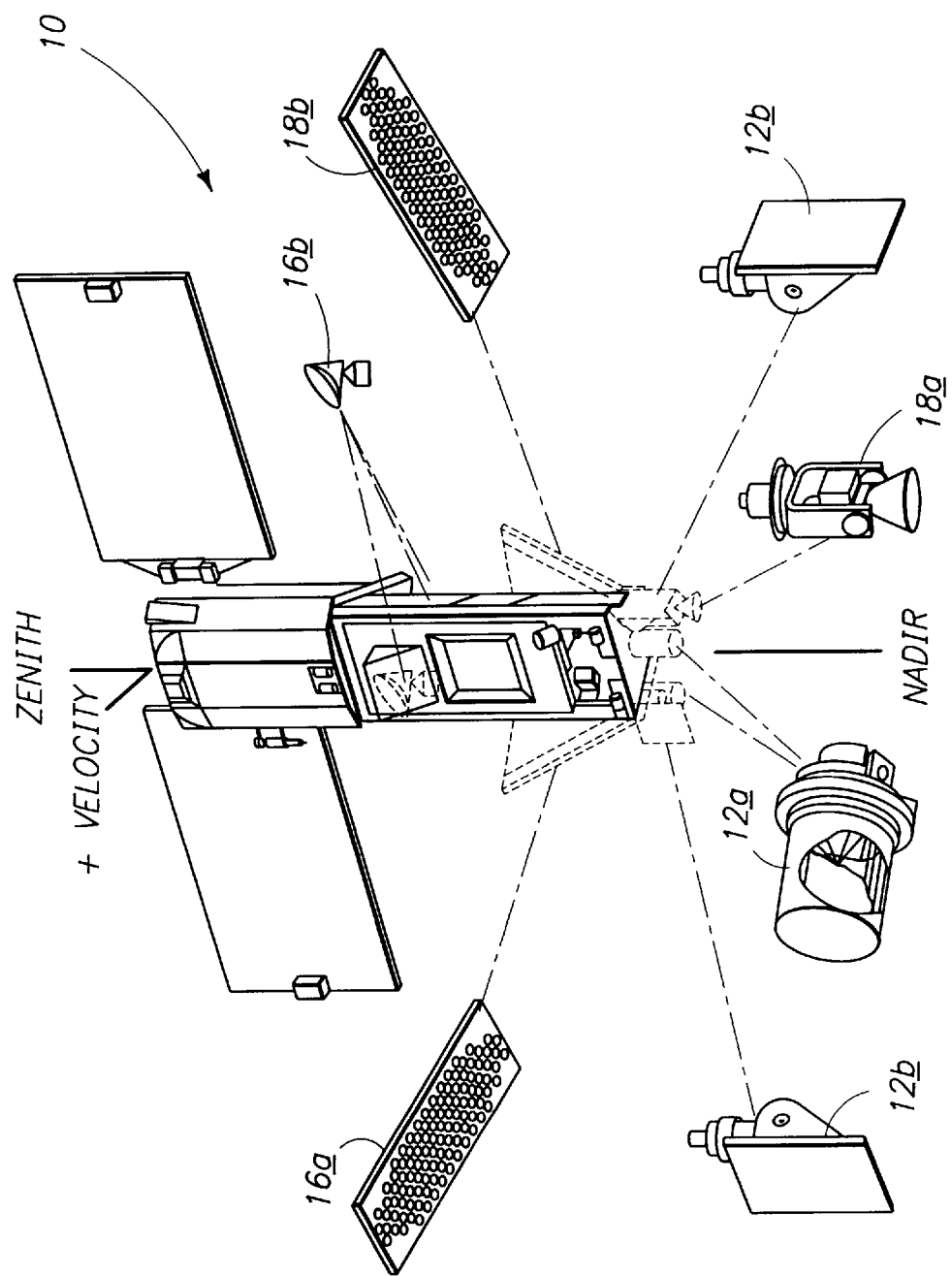
FIG. 3 is a partially exploded perspective view of a host or server satellite in accordance with one embodiment of the present invention.

With reference now to FIG. 3, the comm links of the server satellite 10 will be shown and described.
Server-To-Server Crosslink Communications In a preferred embodiment, each server satellite 10 includes a laser optical communications crosslink 12a to provide secure, survivable, non-vulnerable and un-interceptible transmission and reception of data between server satellites over the inter-satellite communications crosslink 12 (see FIG. 1).

The laser optical communications crosslink 12a preferably comprise a dual aperture secure, wide and narrow band communications element (functioning in a relay-like manner) for both message and data forwarding from one server satellite to another using simultaneous transmission-reception. This is accomplished using (a) shared aperture(s) with gimbal and voice-coil beam steering, full duplex modem and a nominal power at 830 nm wavelength providing 50,000 km or greater range capability.

As an alternative to, or backup support for, the laser optical communications crosslink 12a, the server satellite 10 may include an RF communications crosslink 12b, with K-band communications crosslink antennas being preferred. The RF communications crosslink antennas 12b are preferably located on the port and starboard sides of the spacecraft 10.
Server-Client Link Communications The server satellites 10 include a W-band communications link 16a for communicating with a client mission within its communications field of view over the sever-client communications link 16. An advantage of using the W-band spectrum in the communications link between server and client is that it ensures against terrestrial-based interception as W-band communications are not transmittable through the earth's atmosphere. This feature provides high anti-jam, nonsusceptibility performance.

The W-band communications link 16a preferably comprises multiple narrow beams capable of supporting communications to multiple clients within the server's communications field of regard. A suitable number (determined by mission requirements) of one-degree beamwidth scanning spot beams are employed to support server-client communications mission requirements. Non-satellite endo-atmospheric client missions communicate to the SBS using K-band up/downlink or K-band uplink and EHF downlink due to the presence of the earth's atmosphere.

In accordance with a preferred embodiment, Tracking, Telemetry and Control (TT&C) data is communicated across the up/down link using RF unified Ka-band (or S-band as an option) comm link A secondary 1-kbps Ka-band omnilink (S-band as an option) is provided as a backup. For manned space flight operations, 2-way voice traffic can be supported by an L-band duplex voice link 6 beam antenna. The above described antenna selection is made in view of the cost and commonality with the known IRIDIUM® satellite platform.

As a back up to the W-band communications link 16a, the server satellite 10 is provided with omni RF ring antennas 16b so as to ensure link closure under anomalous client mission situations due to loss of, or partial loss of attitude stabilization which may result in tumbling of a client or mission satellite. The omni RF ring antennas 16b also ensure tracking capability and connectivity between server and client during launch and orbit insertion of the client satellite.

Server Downlink Communications

Each server satellite 10 includes a communications downlink 16 for communicating to a designated earth station. The designated earth station may include conventional terrestrial ground stations and mobile stations such as land vehicles, submarines, surface ships (as shown in FIG. 1), or even airborne users (not shown).

In the preferred embodiment, downlink communication across the server-to-terrestrial station link 18 (FIG. 1) is performed by an encrypto-extremely high frequency (EHF) band spot beam antenna 18a. This antenna enables the use of small, portable field-deployed terminals and small aperture antennas and facilitates inter-operable communications from a variety of different terrestrial and airborne user terminal types and platforms including man-portable, transportable, ground-fixed, ship-based, and airborne applications. The EHF-band communications technology provides the most sophisticated SATCOM link protection available against jamming as well as low probability of signal interception and detection.

In the preferred embodiment, each server satellite 10 is equipped with two suites of EHF downlink antennas 18a. Both suites are comprised of two or more one-degree narrow spot beam optical heads each containing (N) independent scanning spot beams which provide for full terrestrial field-of-regard coverage. The narrow spot beams provide anti-jam nulling capability whereby the antenna pattern adapts upon detection of a jammer. (N) distributed direct broadcast beams are also provided by independent antennas. As an option or alternative to the EHF downlink spot beam antennas 18a, EHS-band phased array antennas 18b may be used.

Data Storage and Processor

Each server satellite 10 is optionally provided with large capacity memory and processor for onboard data storage. This permits storage and processing of received messages and telemetry, client-to server mission payload and/or space generated product data, data fusion, preprocessing of mission data and feature extraction. Similarly, the onboard memory and processor permit temporary or long term storage of terrestrial or airborne data whereby the main memory serves as a cache or swapping memory pending data retrieval by a user. Stored information is also accessible by authorized clients or by authorized terrestrial (either fixed or mobile) receivers either on land, sea or aircraft.

The onboard data storage capability of the SBS is analogous to existing ground-based computer-netted architectures. Partitioned blocks of memory are allocated to client user needs as fast swapping cache storage (awaiting transfer onto the inter-satellite communications link ring topology for dissemination) or for messages received from ground by the master server to a client upon client-to-server interrogation. Large onboard memory capacity also enables onboard processing of client provided data. The SBS provides bandwidth-on-demand capability reducing the need for large channel bandwidths. In accordance with a preferred embodiment of the invention, the ground user is provided with the following data management options from the server:

a) pre-processed data only;
b) finished product reduced and processed data requiring only narrow band transmission at lower data rates; and
c) wide band, unprocessed data, stored and forwarded to the user in a burst readout mode.

In operation, the SBS network architecture provides a single point reception and transmission for all Telemetry, Tracking & Control (TT&C) functions between a (the) designated ground station(s) and other mission (client) orbiting or Geo-stationary satellites. The SBS network architecture significantly reduces the number of ground stations presently in use and planned for, in executing ground control TT&C functions. Data originating from a designated ground station is transmitted to the master server (designated as the server having communications accessibility to the ground station) within communication capture range of the terrestrial TT&C transmitter in an E-mail type fashion and is either directly forwarded to the intended client or simply stored for subsequent interrogation by the intended client or other authorized clients. The client satellites are not constrained by their particular orbits and need only be capable of establishing link closure with any server satellite at any location, and at any time in its orbit. The client interrogates its communications accessible host server for a stored message from ground or another client via an authorized designated access code. The interrogation message is passed via the inter-satellite link (ISL) to the master server. Alternatively, the master server, upon receiving a ground station generated message, may pass the message directly to the client's host server for retrieval. If a message is present, it is passed back over the ISL to the host server for access by the client. Likewise, the client may at any time in its orbit pass health/status data to the local host server. The local host server, in turn, then passes this data over the token ring to the designated host server having communications link closure to the designated terrestrial ground reception station.

Use of a W-band link between the client and server is preferred because of bandwidth and survivability performance criteria. Immunity is afforded by W-band from terrestrial sources attempting to intercept, or jam transmission or reception of data because of heavy atmospheric transmission losses otherwise incurred. Use of a radio frequency (RF) client to server link is preferred over a laser link so as to ensure tracking capability (via omni capability link closure) and connectivity of any client with the server in the event of client tumbling, or partial loss of attitude stabilization. Hence, the SBS network architecture of the present invention provides for anytime, any place direct communications to client satellites thereby removing existing constraints for passing information only when a satellite is within capture of its ground station on designated orbits. In the SBS architecture, a client now passes and receives data with its Comm closure pointed up towards the server and not down towards earth as presently performed. This approach significantly reduces susceptibility to jamming, hacking, interception, and otherwise temporal constraints due to existing satellite to ground station communications, positional relationships and communications constraints.

Figure 4:
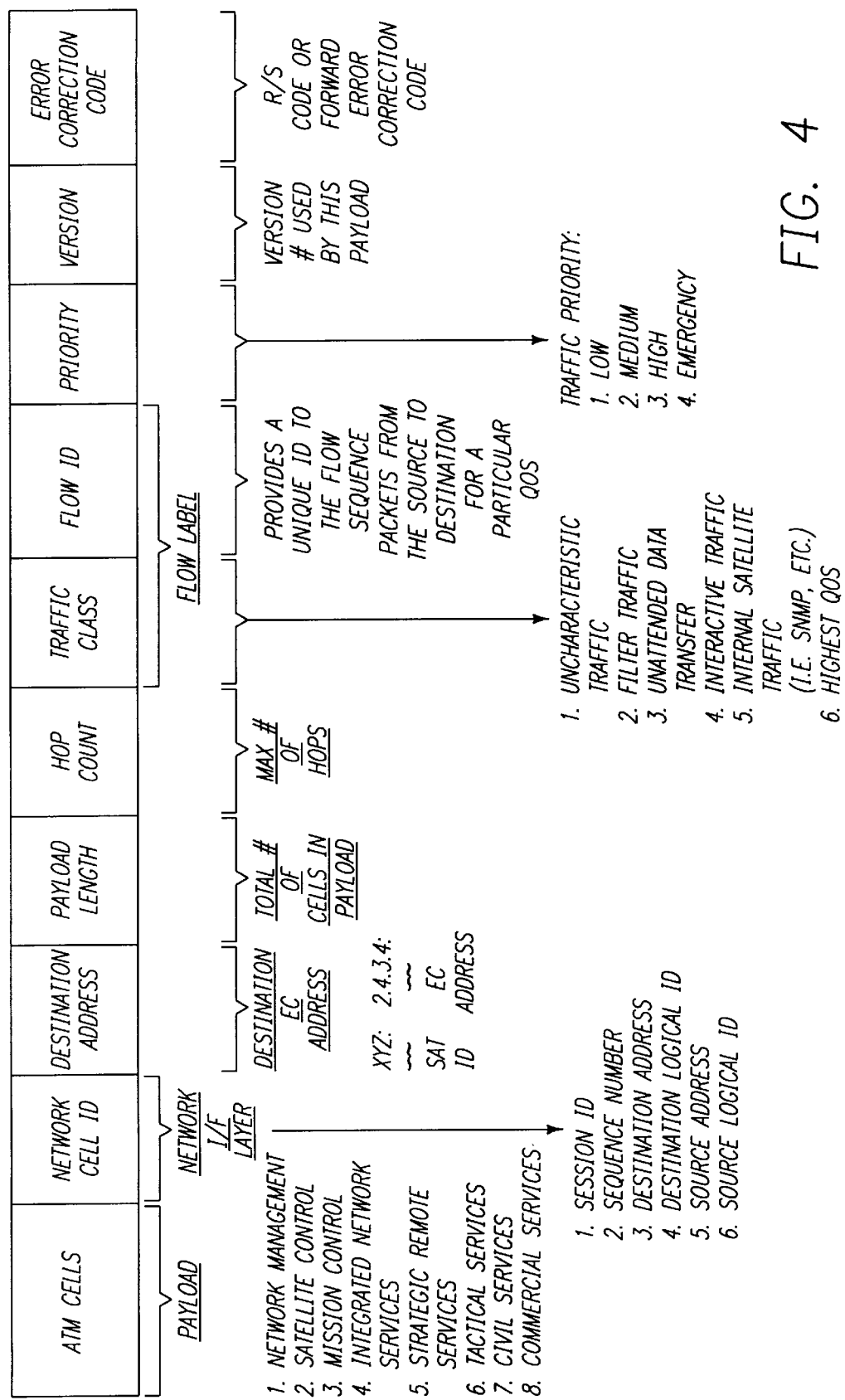
FIG. 4 is a diagram which illustrates the space network protocol (SNP) format for sending and receiving data and messages over the space-based server architecture of the present invention.

The SBS network architecture provides for near-total worldwide communications access using a modified TCP/IP standard space network protocol format. The Space Network Protocol format of the present invention is shown diagrammatically in FIG. 4.

In the preferred embodiment, the spaced-based server implements a modified form of Space Communications Protocol Standards-Transport Protocol (SCPS-TP) as an extension of the well established Transmission Control Protocol/Internet Protocol (TCP/IP) internetworking protocol to handle specific congestion related problems unique to space transmission applications of the TCP/IP. These can include propagation delay time, bandwidth limitation/ allocation by law, asymmetric link capabilities, and intermittent connectivity, all of which contribute to degradation of space-to-ground communications performance.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

What is claimed is:

1. A space-based server network architecture which permits on demand transfer of data between a client satellite in an orbit about earth and an earth station irrespective of the location of the client satellite relative to the earth station, the space-based server architecture comprising:
    a) a plurality of client satellites located in one or more earth orbits;
    b) a plurality of server satellites located spaced apart in at least one earth orbit and being sufficient in number to provide substantially total world-wide communications coverage to and connectivity with designated and authorized earth stations and said plurality of client satellites, said at least one earth orbit of said server satellites being higher than said one or more earth orbits of said client satellites, each of said server satellites including:
        i) communications downlink means for providing intercommunication with designated and authorized earth stations within its field of view;
        ii) communications crosslink means for providing intercommunications with other server satellites within its field of view;
        iii) communications link means for providing intercommunication with a client satellite within its field of view; and
    c) whereby control data for a particular client satellite originating from an earth station is passed directly to an accessible server satellite within its terrestrial communications link field of view and said accessible server satellite, in turn, passes said control data either directly to said particular client satellite over said communications link means if within its communications field of view, or transmits said control data over said communications crosslink means to a server satellite having direct communications access to said particular client satellite; and
    d) whereby each client satellite can at any time transmit its mission data to a designated earth station, irrespective of its location on earth, by transmitting said mission data over said communications link means to a server satellite within its communication field of view which, in turn, passes said mission data either directly to the designated earth station over said communications downlink means if within its communications field of view, or transmits said mission data over said communications crosslink means to a server satellite having communications downlink access to the designated earth station.

2. A space-based server network architecture as in claim 1, wherein said communications downlink means comprise a high frequency band spot bean antenna sufficient to provide jam-resistant communications.

3. A space-based server network architecture as in claim 1, wherein said communications crosslink means comprises a wide-band optical laser communications link.

4. A space-based server network architecture as in claim 1, wherein said communications crosslink means comprises a radio frequency communications link.

5. A space-based server network architecture as in claim 1, wherein said communications link means comprises a W-band communications link.

6. A space-based server network architecture as in claim 5, wherein said communications link means further includes an omni RF communications link to ensure tracking capability and connectivity between a server satellite and a client satellite during initial launch and orbit insertion of said client satellite and in the event of tumbling or partial loss of attitude stabilization of said client satellite.

7. A space-based server network architecture as in claim 1, wherein each of said server satellites includes high capacity onboard memory sufficient for cache storage or longer term storage of earth station generated communications data.

8. A space-based server network architecture as in claim 1, wherein said server satellites include communications links oriented pointed upwards towards said server satellites.

9. A space-based server network architecture as in claim 1, wherein:
    a) said server satellites are placed in geosynchronous orbit; and
    b) said client satellites are placed in either one of a low or medium earth orbit.

10. A space-based server network architecture which permits on demand transfer of data between a client satellite in an orbit about earth and an earth station irrespective of the location of the client satellite relative to the earth station, the space-based server architecture comprising:
    a) at least one earth station;
    b) a plurality of client satellites located in one or more earth orbits;
    c) a plurality of server satellites located spaced apart in at least one earth orbit and being sufficient in number to provide substantially total world-wide communications coverage to and connectivity with designated and authorized earth stations and said plurality of client satellites, said at least one earth orbit of said server satellites being higher than said one or more earth orbits of said client satellites, each of said server satellites including:
        i) communications downlink means for providing intercommunication with said at least one earth station;
        ii) communications crosslink means for providing intercommunications with other server satellites within its field of view;
        iii) communications link means for providing intercommunication with a client satellite within its field of view; and
    d) whereby control data for a particular client satellite originating from said at least one earth station is passed directly over to an accessible server satellite within its terrestrial communications link field of view and said accessible server satellite, in turn, passes said control data either directly to said particular client satellite over said communications link means if within its communications field of view, or transmits said control data over said communications crosslink means to a server satellite having direct communications access to said particular client satellite; and e) whereby each client satellite can at any time transmit its mission data to said at least one earth station, irrespective of its location on earth, by transmitting said mission data over said communications link means to a server satellite within its communication field of view which, in turn, passes said mission data either directly to said at least one earth station over said communications downlink means if within its communications field of view, or transmits said mission data over said communications crosslink means to a server satellite having communications downlink access to the designated earth station.

11. A space-based server network architecture as in claim 10, wherein said communications downlink means comprise a high frequency band spot bean antenna sufficient to provide jam-resistant communications.

12. A space-based server network architecture as in claim 10, wherein said communications crosslink means comprises a wide-band optical laser communications link.

13. A space-based server network architecture as in claim 10, wherein said communications crosslink means comprises a radio frequency communications link.

14. A space-based server network architecture as in claim 10, wherein said communications link means comprises a W-band communications link.

15. A space-based server network architecture as in claim 14, wherein said communications link means further includes an omni RF communications link to ensure tracking capability and connectivity between a server satellite and a client satellite during initial launch and orbit insertion of said client satellite and in the event of tumbling or partial loss of attitude stabilization of said client satellite.

16. A space-based server network architecture as in claim 10, wherein said server satellites include communications links oriented pointed upwards towards said server satellites.

17. A space-based server network architecture as in claim 10, wherein:

a) said server satellites are placed in geosynchronous orbit; and b) said client satellites are placed in either one of a low or medium earth orbit.

18. A space-based server network architecture as in claim 10, wherein said at least one earth station comprises land-based, sea-based and airborne platforms.

* * * * *